(12) United States Patent
Da Veiga et al.

(10) Patent No.: US 10,139,631 B1
(45) Date of Patent: Nov. 27, 2018

(54) APPARATUS AND METHOD OF 1:1 MATCHING HEAD MOUNTED DISPLAY VIEW TO HEAD MOVEMENT THAT CONTROLS ARTICULATED CAMERA

(71) Applicant: MICROSOFT TECHNOLOGY LICENSING, LLC, Redmond, WA (US)

(72) Inventors: Alexandre Da Veiga, San Francisco, CA (US); Roger Sebastian Kevin Sylvan, Seattle, WA (US); Kenneth Liam Kiemele, Redmond, WA (US); Nikolai Michael Faaland, Sammamish, WA (US); Aaron Mackay Burns, Newcastle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/614,594

(22) Filed: Jun. 5, 2017

(51) Int. Cl.
*G02B 27/14* (2006.01)
*G02B 27/01* (2006.01)
*G05D 1/00* (2006.01)

(52) U.S. Cl.
CPC ....... *G02B 27/0172* (2013.01); *G05D 1/0038* (2013.01); *G02B 2027/0123* (2013.01); *G02B 2027/0138* (2013.01)

(58) Field of Classification Search
CPC ............ G02B 27/0172; G02B 27/0093; G02B 27/0015; G02B 2027/0138; G02B 2027/014; G02B 2027/0187; G02B 2027/0123; G02B 23/125; G05D 1/0038

USPC ........ 348/47, 51–60; 359/13, 631, 632, 633, 359/635, 470, 629
See application file for complete search history.

(56) References Cited

U.S. PATENT DOCUMENTS

| 2009/0112387 A1 | 4/2009 | Kabalkin et al. |
| 2015/0029218 A1 | 1/2015 | Williams et al. |
| 2015/0293362 A1* | 10/2015 | Takahashi .............. G02B 27/02 348/47 |
| 2016/0031559 A1 | 2/2016 | Zang |

FOREIGN PATENT DOCUMENTS

CN        202587217 U     12/2012

OTHER PUBLICATIONS

STIC search, May 31, 2018.*
Wang, et al., "Drone were me: Flying drone as avatar by aligned stereo view and head pose", In Proceedings of IEEE 5th Global Conference on Consumer Electronics, Oct. 11, 2016, 2 pages.
(Continued)

*Primary Examiner* — Stephone B Allen
*Assistant Examiner* — Travis Fissel
(74) *Attorney, Agent, or Firm* — NovoTechIP International PLLC

(57) ABSTRACT

Tracking a user head position detects a change to a new head position and, in response, a remote camera is instructed to move to a next camera position. A camera image frame, having an indication of camera position, is received from the camera. Upon the camera position not aligning with the next camera position, an assembled image frame is formed, using image data from past views, and rendered to appear to the user as if the camera moved in 1:1 alignment with the user's head to the next camera position.

20 Claims, 8 Drawing Sheets

(56) References Cited

OTHER PUBLICATIONS

Pittman, et al., "Exploring Head Tracked Head Mounted Displays for First Person Robot Teleoperation", In Proceedings of the 19th international conference on Intelligent User Interfaces, Feb. 24, 2014, 6 pages.

Higuchi, et al., "Flying head: a head motion synchronization mechanism for unmanned aerial vehicle control", In Proceedings of Extended Abstracts on Human Factors in Computing Systems, Apr. 27, 2013, pp. 2029-2038.

Kohki, et al., "KinecDrone: enhancing somatic sensation to fly in the sky with Kinect and AR. Drone", In Proceedings of the 5th Augmented Human International Conference, Mar. 7, 2014, 2 pages.

Gaudiosi, John, "Now you can pilot a real-world drone from inside virtual reality", http://fortune.com/2015/10/21/cloudlightfpv-vr-app-for-drones/, Published on: Oct. 22, 2015, 12 pages.

Solstad, Torkil Eide, "Improved user-experience for control of RoVs", In Thesis of Norwegian University of Science and Technology, Jun. 2016, 75 pages.

Singletary, Charles, "DJI is Bringing VR Goggles to a Top Tier Compact Mavic Drone", http://uploadvr.com/dji-bringing-vr-goggles-mavic-drone/, Published on: Sep. 29, 2016, 3 pages.

"UAV Controlled by VR HMD", http://www.goertek.com/en/content/details21_913.html, Retrieved on: Feb. 8, 2017, 3 pages.

Webster, Andrew, "Controlling an AR Drone quadrocopter with an Epson Moverio BT-100 head-mounted display", http://www.theverge.com/2012/3/9/2857224/ar-drone-quadrocopter-epson-moverio-bt-100-control, Published on: Mar. 9, 2012, 1 pages.

Carbotte, Kevin, "Inside-Out Position Tracking Software for VR, AR Device OEMs: Eonite Announces Vantage Head Tracker", http://wvvw.tomshardware.com/news/eonite-vantage-inside-out-tracking,33404.html, Published on: Jan. 12, 2017, 7 pages.

\* cited by examiner

APPARATUS AND METHOD OF 1:1 MATCHING HEAD MOUNTED DISPLAY VIEW TO HEAD MOVEMENT THAT CONTROLS ARTICULATED CAMERA

TECHNICAL FIELD

This disclosure relates generally to telepresence via remote user control of movable cameras, and, more particularly, to matching of remote user head motion and rotation to the video presented to the user.

BACKGROUND

A user can operate a joystick or other manual interface to remotely control a camera equipped drone, while watching the drone's camera image on a display. This technique can be acceptable for certain applications, but has limitations. One is that high user skill may be required. Another is that for some applications and users, watching the camera view on a head mounted display (HMD) may be preferable. However, a user controlling a drone with a joystick or other manual interface while watching the camera view on an HMD can find the experience unsettling. This can be due to changing orientation of the view on the HMD without any inner ear sense of a corresponding changing of head orientation.

The HMD can be provided with a controller or sensor package that observes the user's head position and orientation and transmits corresponding signals to the drone, with the objective of the drone tracking that position and orientation. However, technical issues in this technique can make it unsuitable for various applications. One is matching the orientation of the image on the HMD to the movement of the user's head with low latency to avoid motion sickness.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure Disclosed apparatuses include an apparatus that can include a head mounted display, configured to be worn by a user, a head position tracker configured to track a position of the user's head, and generate a corresponding head position signal, and a camera position controller, configured to detect a change in the position of the user's head from a current head position to a new head position and, based at least in part on detecting the change, to communicate a command to a movable support for a camera to a next camera position, the next camera position being aligned with the new head position. The apparatus can include a data storage, configured to store a surface map, the surface map including a population of past views of respective portions of an environment and, for each past view, information identifying its viewing position. The apparatus can include an image assembly module, coupled to the data storage, and configured to determine, based on the next camera position, a next camera viewing region, the next camera viewing region being a region of the environment that will be in a camera field of the camera when in the next camera position, receive a camera image frame from the camera, the camera image frame including an indication of camera position, determining, based at least in part on the indicated camera position, whether the image frame covers all of the next camera viewing region and, upon determining the camera image frame does not cover all of the next camera viewing region, generate an assembled image frame that encompasses the next camera viewing region, the assembled image frame including image data from at least one of the past views, and can include a rendering module, configured to render a 3D image from the assembled image frame, the 3D image appearing as if viewed from the next camera position. Technical features provided by the assembly and rendering can include, as will be understood from this disclosure, the 3D image appearing to the user as if the camera moved in 1:1 non-delayed alignment with the user's head.

Disclosed methods include a method that can include storing a surface map, the surface map including a population of past views of respective portions of an environment and, for each past view, information identifying its viewing position, tracking a position of a user's head, detecting, based the tracking, a change in a position of the user's head from a current head position to a new head position, upon detecting the change in the position of the user's head, communicating a command to a movable support for a camera to a next camera position, the next camera position being aligned with the new head position. The method can include determining, based on the next camera position, a next camera viewing region, the next camera viewing region being a region of the environment that will be in a camera field of the camera when in the next camera position, receiving a camera image frame from the camera, the camera image frame including a camera position stamp, determining, based at least in part on the camera position stamp, whether the image frame covers all of the next camera viewing region. The method can include, upon determining the camera image frame does not cover all of the next camera viewing region, generating an assembled image frame that encompasses the next camera viewing region, the assembled image frame including image data from at least one of the past views, and can include rendering a 3D image from the assembled image frame, the 3D image appearing as if viewed from the next camera position.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the disclosed subject matter. It will be apparent to persons of ordinary skill, upon reading this description, that various aspects can be practiced without such details. As will be understood by persons of skill upon reading this disclosure, benefits and advantages provided and enabled by disclosed subject matter and its various implementations can include, but are not limited to, a solution to the technical problem arising in head motion control of drone supported or other remote articulated or movable cameras, arising from mismatches between the user's head motion and images on the user's head-mounted display (HMD). Technical features include 1:1 matching the motion of the camera on the drone to the user's head movement, and "1:1" includes tracking the head motion and using a result to render at least a portion of the camera image data from known past locations and orientations of the camera, to a view of the local environment as would be seen by the user from his current location and orientation, rendered to appear to the user as if the camera moved in 1:1 non-delayed alignment with the user's head to the next camera position.

Figure 1:
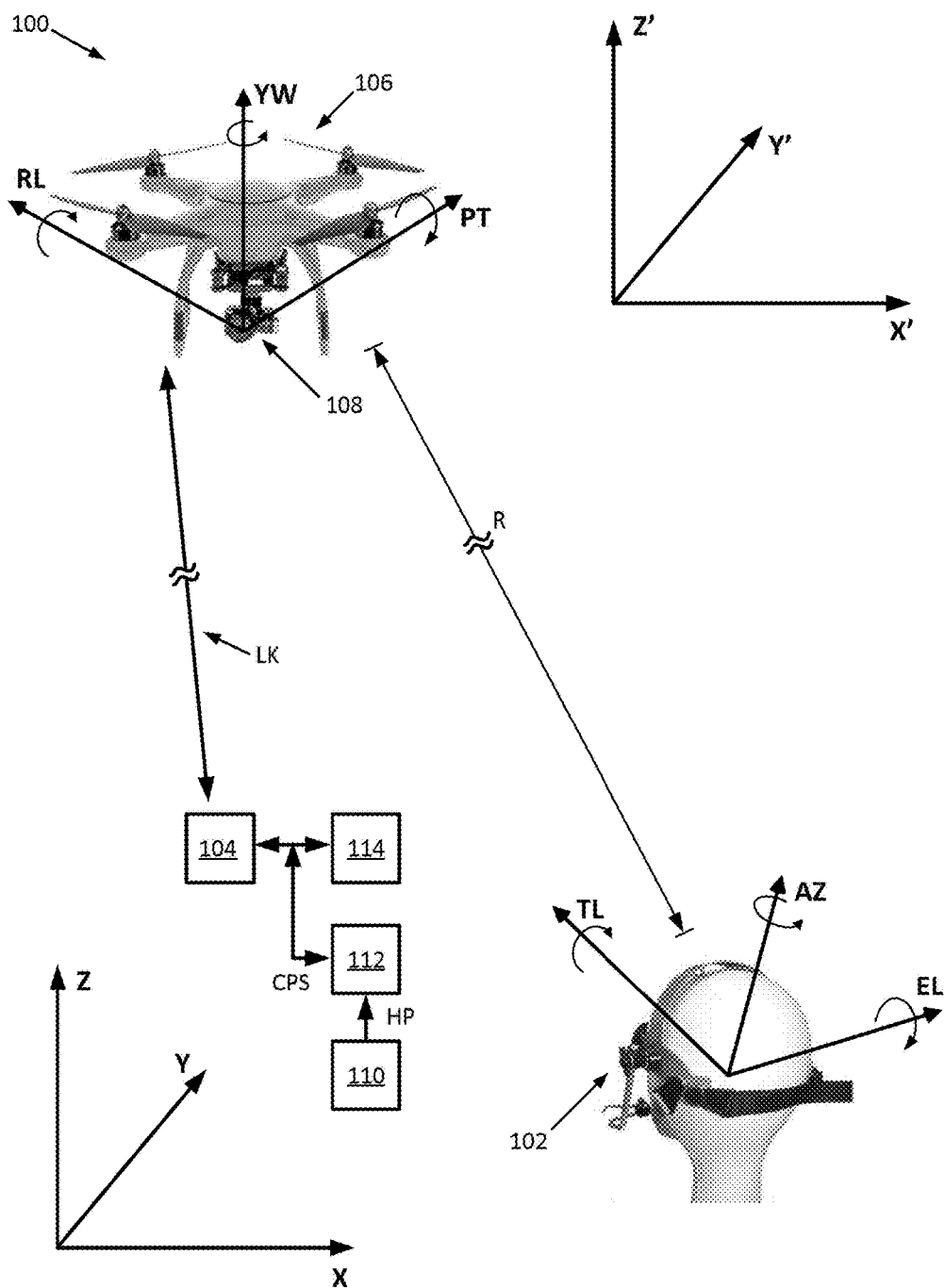
FIG. 1 illustrates a system for head-mounted display (HMD) remote control of a camera equipped drone, with 1:1 matching of head motion to HMD image, according to one or more aspects the present disclosure.

FIG. 1 shows a two-dimensional projection of a system 100 that includes HMD 102 on a user, a wireless base transceiver 104 in communication, directly or indirectly, with the HMD 102 and configured to establish a wireless link LK over a distance R to a wireless drone transceiver (not visible in FIG. 1) installed on a drone 106. A camera 108 can be mounted on the drone 106, for example, by a fixed mount or by a multiple-axis gimbal mount (not visible in FIG. 1). The distance R can include altitude, in a direction normal to the plane of FIG. 1. The numerical ranges of R can be application-specific and can include, for example, distances beyond visual range. Propulsion (not explicitly visible in FIG. 1) of the drone 106 can include, for example, propellers or ducted fans, which can be driven by battery-powered electric motors, or by an internal combustion engine, e.g., gas turbine or reciprocating engine. The drone 106 can be configured with hybrid propulsion, for example, batteries rechargeable by an internal combustion engine.

It will be understood that FIG. 1 is not necessarily drawn to scale, and the wireless base transceiver 104 is not necessarily proximal to the user. For example, implementations can include the user being remote from the wireless base transceiver 104 and can include an Internet or other wide area network (WAN) connection of the user to a field-deployed version of the wireless base transceiver 104.

Referring to FIG. 1, the system 100 can include a head position tracker 110, integrated with the HMD 102 or provided by resources external to HMD 102, configured to track the position of the user's head, and generate a corresponding head position signal HP. The head position signal HP can include a head location data HL and a head orientation data HT. The system 100 can include a camera position controller 112 that can receive HP and, based at least in part on its value, generate a camera position signal (CPS) that the wireless transceiver 104 transmits over the link LK to the drone 106. The camera position control signal CPS can include information instructing the drone 106 to move the camera 108 to a location and orientation that matches (at a translated position) the head position tracker 110 tracking of the location and orientation of the user's head. CPS can be configured, for example, to control propulsion resources and control surfaces (not visible in FIG. 1) of the drone 106, and control gimbal axis actuators (if any). Configuration of the camera position controller 112 can depend in part on the specific implementation of the drone 106 and on the mechanism or structure of the camera mount. For example, in implementations that use a multiple-axis gimbal, there can be a range of strategies to effectuate a rotation of the orientation of camera 108.

The head position tracker 110 can be configured to track user head location in three-dimensions that can be defined, for example, by orthogonal (X, Y, Z) axes. The (X, Y) axes can be, for example, a two-dimensional position on a floor space or other area, and (Z) can be an elevation. The "Z" feature can provide the user with head control of an elevation of the drone 106, for example by squatting or standing on his toes. The X, Y, Z axes can be termed a "user location reference." In an aspect, the directions of the X, Y, Z axes can be defined by the world view that is presented on the user's HMD 102.

Regarding axes for tracking user head orientation, the head position tracker 110 can be configured to track left-to-right head rotation about the FIG. 1 "azimuth" or "AZ" axis, and elevation about the FIG. 1 "EL" axis. HT data can, accordingly, include an AZ and EL value. In addition, the head position tracker 110 can be configured to track head tilt, to the left or right, about the FIG. 1 tilt axis "TL," and HT can include a corresponding "TL" value. The AZ and EL axes, or the AZ, EL, and TL axes can be termed a "head orientation reference."

Regarding a frame of reference for the location of camera 108, FIG. 1 shows X', Y', Z' axes, graphically proximal the drone 106. The X', Y', Z' axes can be defined by an external reference, such as the Global Positioning System (GPS). The X', Y', Z' axes can be termed a "camera location reference." Regarding a frame of reference for the orientation of the camera 108, the system 100 can include a yaw axis, labeled "YW," and a pitch axis, labeled "PT." The system 100 can also include a roll axis for the camera 108, labeled "RL." The YW and PT axes, or the YW, PT, and RL axes can be termed a "camera orientation reference."

The camera position controller 112 and an image processor 114, described in greater detail later, can store a translation map between the camera location reference and the user location reference, i.e., an X', Y', Z' to X, Y, Z translation, and between the head orientation reference and the camera orientation reference, i.e., an AZ, EL, TL to YW, PT, RL translation.

As described above, the head position tracker 110 can be integrated with the HMD 102, and can include resources external to the HMD 102. For example, the head position tracker 110 can include an external camera (not visible in FIG. 1) directed at the user's head. Persons of ordinary skill in the HMD arts, upon reading the present disclosure, can readily implement head position tracker 110 by adapting conventional techniques of head tracking, including but not limited to external cameras, accelerometers, gyroscopes, magnetometers, and combinations thereof. Further detailed description of implementations of the head position tracker 110 is therefore omitted.

The camera 108 can be configured to provide a given field of view. The field of view can be termed, for purposes of description, as a "camera field." The camera field is preferably, but not necessarily, greater than or equal to the field of view provided by the HMD 102. Exemplary relation of camera field to HMD field is described in greater detail later.

The camera 108 can be configured to generate time-stamped R×S pixel camera frames. The generation can be at a fixed frame rate FR, a variable frame rate, or event-triggered, or any combination thereof. The camera 108 can transmit the frames to the wireless base transceiver 104, for delivery to the image processor 114. The image processor 114 can include a frame storage (not visible in FIG. 1), configured to store an archive or database of the frames. The database can be referred to as a "surface map." The surface map can be associated, for example, with a given site that a user desires to visit or inspect by virtual presence. The surface map can be configured as a plurality of surface maps, each corresponding to a particular location or site. Example application environments in which surface maps can be constructed and used in processes can include, but are not limited to, one or more building exterior roofs, interior ceiling surfaces, underside surfaces of bridge, insulators of a high tension power transmission line, structures and fittings in offshore oil platform. It will be understood that these are only examples, as the inspection site can be any surface within flight capabilities of the drone.

The surface map is not limited to frames provided by the camera 108. The surface map can include, for example, 3D polygonal or point cloud data constructed from depth sensors. The surface map can also include or visual tracking information, such as image feature tracking.

In one or more implementations, each surface map frame can be indexed, or searchable, according to its camera position and camera orientation. A surface map can be referred to as "complete" if every surface (within resolution limits) of the inspection site appears in at least one of the surface map frames. A complete surface map can include, as arbitrary example populations, more or less than a hundred surface map frames. The population can likewise include a thousand surface frames or tens of millions of surface map frames, and less than or more than any of these example populations.

In example processes in or on systems and methods according to this disclosure, a surface map of an inspection site can be constructed prior to a virtual presence. Such a surface map can be constructed, for example, using the same drone 106 and camera 108. Such a surface map can be constructed, for example, using another drone supporting another camera. Alternatively, or additionally, the surface map can be constructed, at least in part, prior to a virtual presence, and updated with frames generated during the virtual presence operations.

Figure 2:
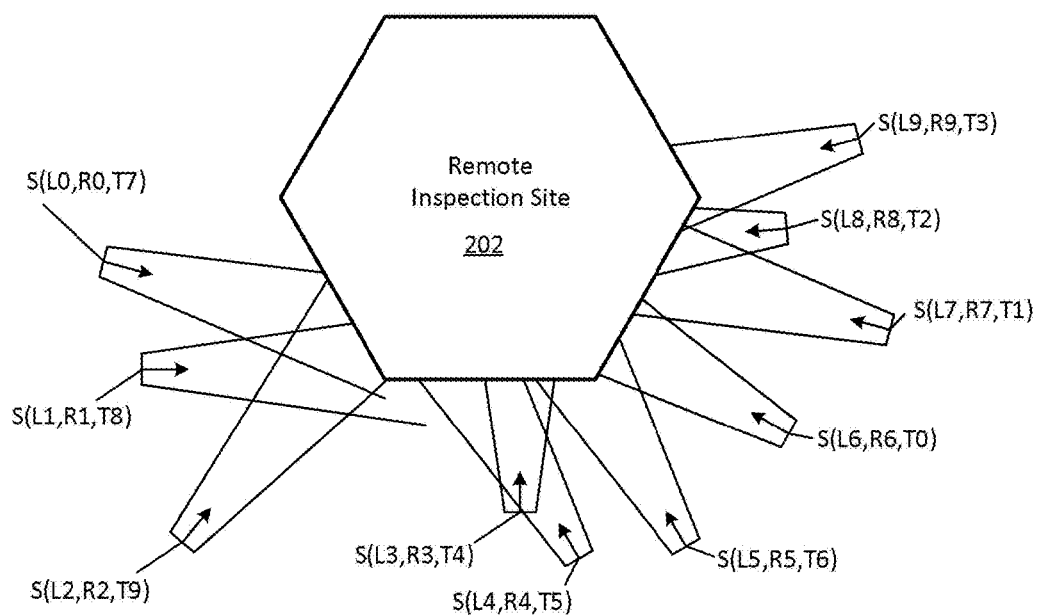
FIG. 2 illustrates exemplary surface map frames for systems and methods for 1:1 matching HMD view to head position, according to one or more aspects of the present disclosure.

FIG. 2 illustrates an example population of ten surface map frames S(Lx, Rx, Tx), where Lx is the camera location from which the image frame was captured, Rx is the camera orientation when the image frame was captured, and Tx is the time stamp. Lx can be in terms of X', Y', and Z', and in implementations omitting Z', and can use only X' and Y'. Rx can be, but is not necessarily, in terms of YW, PT, and RL. For example, systems and methods according to this disclosure can be implemented using only YW, or only YW and PT.

Each of the ten surface map frames S(Lx, Rx, Tx) captures a surface area of the remote inspection site 202. FIG. 2 graphically represents the surface area as bounded by the inverted dotted line cone—visible in cross-section as a pair of dotted ray lines angled apart and extending toward a surface of remote inspection site 202. It can be preferable that the surface areas overlap, as illustrated by the FIG. 2 examples. The surface map frames S(Lx, Rx, Tx) can be stored, for example, in a frame memory of the FIG. 1 image processor 114. The ten surface map frames S(Lx, Rx, Tx) can be an entire surface map, or can be samples from a surface map having a larger population of surface maps. As described above, a surface map can be referred to as a "complete" surface map if all resolvable surfaces appear in at least one of the surface map frames. The ten surface map frames S(Lx, Rx, Tx) therefore do not, on their own, form a compete surface map because surface areas of the remote inspection site 202 do not appear in any of the surface map frames.

Figure 3:
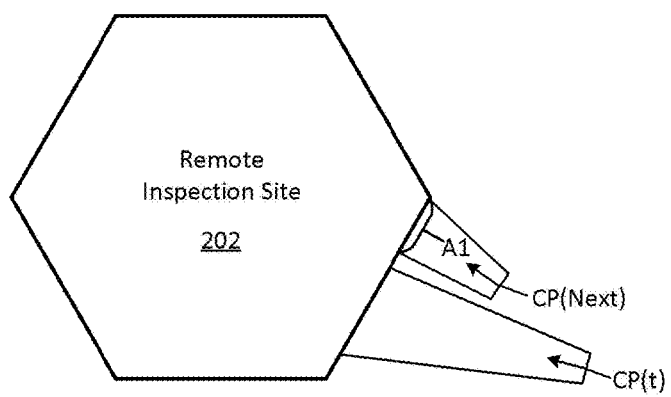
FIG. 3 illustrates an initial camera position delay, for a process in 1:1 matching HMD view to head position according to one or more aspects of the present disclosure.

FIG. 3 illustrates an initial camera position delay, for a process in 1:1 matching HMD view to head position according to one or more aspects of the present disclosure. For convenience, example operations are described in reference to FIG. 1. Referring to FIG. 3, the position of the camera 108 at T10 is CP(T10). The position, CP, includes a camera 108 location, e.g., in X', Y', Z', and a camera 108 orientation, for example, in YW, PT, and RL. It will be assumed that immediately preceding T10 the position of the user's head was stationary for a duration sufficient for the camera 108 to be in alignment with the user's head.

The FIG. 3 example assumes that, at T10, the head tracker 110 detected the user's head had moved to a new position, i.e., new location and new orientation. The drone positioning control 112 can, in response, send a corresponding CPS instructing the drone 106 to reposition the camera 108 to an instructed new camera position aligned with the user's new head position. For purposes of example, it will be assumed that the FIG. 3 camera position labeled "CP(Next)" is the instructed new camera position that corresponds to the example user head movement identified above. In other words, the camera 108 at CP(Next) will align with the user's new head position. However, the camera 108 is not currently, where "currently" means at T10, aligned with the user's head. This is due to an accumulation of delays (e.g., delays in the head position tracker 110, camera position controller 112, transmission delay for CPS to reach the drone 106, and response time of the drone 106), causing the camera's position to lag significantly. Therefore, if the raw feed from the camera 108 were continued on the HMD display, the user would experience the sensation of movement, but the HMD view would be unchanged. This might be unsettling or otherwise unsatisfactory for the user.

FIGS. 4A-4D illustrate a sequence of four selections of surface map frames, for a corresponding sequence of four image assemblies. As will be described in greater detail in subsequent paragraphs, each of the four image assemblies is in a process of generating an HMD view, in 1:1 matching HMD view to head position according to one or more aspects of the present disclosure. Example operations will be described assuming the change in user head position illustrated in FIG. 3, and assuming the FIG. 2 example surface map.

Figure 4A:
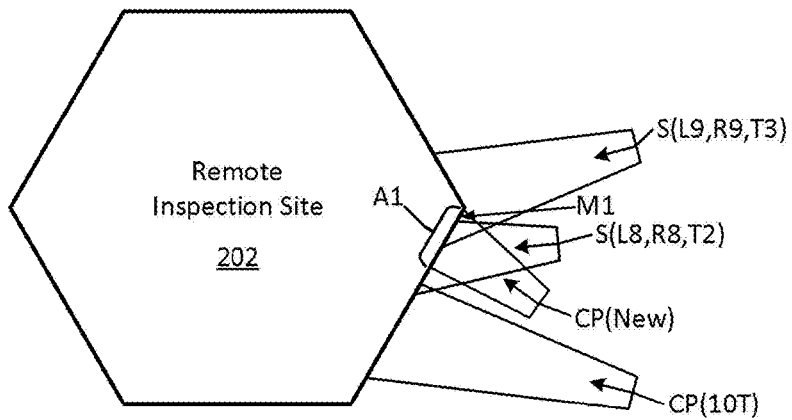
FIGS. 4A-4D illustrate example assemblies of HMD views, in an application of a process in 1:1 matching HMD view to head position, according to one or more aspects the present disclosure.

Referring to FIG. 4A, A1 is the surface view of the remote inspection site 202 that would appear on the HMD view if the camera 108 were aligned with the user's head. As can be seen in FIG. 4A, though, A1 is not within the current camera frame. In an image assembly process according to this disclosure, operations can include searching the surface map for surface map frames that, alone or in combination with one another, cover all of A1. The surface map frames, alone or in combination, that satisfy this requirement can be arbitrarily termed, for purposes of describing exemplary operations, as "assembly frame group." At T10, the only "assembly frame group" is the combination of S(L8, R8, T2) and S(L9, R9, T3). The surface map frame S(L8, R8, T2), standing alone, is insufficient because it does not include the portion of A1 labeled "M1." As will be described in greater detail later, if there are more than one possible sets of surface map frames that can form an "assembly frame group," operations can apply weighting. For example, weighting can include preference based on recency of the time stamp. Another example weighting can include preference to use surface map frames having a camera orientation that is closer to the new orientation of the user's head.

The image assembly process can be performed, for example, by the image processor 114 operating on the surface map stored in a frame memory, with the image processor 114 executing computer executable instructions stored in an instruction memory, as described in greater detail later.

The result of the image assembly can be termed a "raw HMD view" because the assembly frame group, even though it covered the viewing area A1, consists of surface map frames that captured the surface area from camera locations and camera orientations different from the camera location and camera orientation, i.e., CP(Next), that matches the user's new head position. Accordingly, in processes according to this disclosure, an adjusted rendering can be applied. The adjusted rendering can be an inverse of the distortion, of the raw HMD view, using the location and orientation information of each surface map frame in the assembly frame group to be formed. The result of the adjusted rendering can be a 3D image of what, or close to what, the user would likely see if, as a hypothetical, the camera 108 had tracked the change in head position, with zero delay (which is viewing position corresponding to CP(Next). The result is what the user would "likely see" because the assembly frame group is formed of past frames. It does not reflect a current camera view of A1.

In processes in one or more systems and methods according to this disclosure, the output of the adjusted rendering can be presented as the HMD view. Processes can also include applying a late stage correction to the output of the adjusted rendering. The late stage correction can include, for example, update information from new camera frames. This may occur if the camera field now covers any of A1. This is not the case for the example illustrated in FIG. 4A. The late stage correction can be shift to compensate for a late detection of additional head movement by the user.

The adjusted rendering and the late stage correction can be performed, for example, by the image processor 114 executing computer executable instructions stored in the instruction memory described above.

Figure 4B:
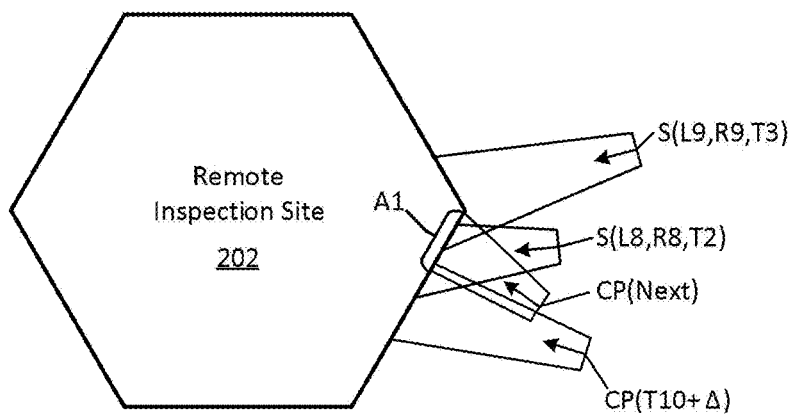

FIG. 4B illustrates the camera 108 position at T10 plus Δ, and a corresponding camera field labeled CP(T10+Δ). The camera position is closer to but still not aligned with CP(Next). As can be seen, a portion of A1 is in the camera field CP(T10+Δ). Therefore, the assembly frame group at T10 plus Δ can be S(L8, R8, T2) and S(L9, R9, T3), used at T10, and the current frame capturing the field CP(T10+Δ). The image assembly process can be repeated, using S(L8, R8, T2), S(L9, R9, T3), and the camera field at CP(T10+Δ). The above-described adjusted rendering can be applied, updated with the camera field at CP(T10+Δ). The result can therefore be more likely to what the camera 108 would see, if at CP(Next). The late stage correction can be repeated, for example, using information in the camera field at CP(T10+Δ). The repeated adjusted rendering and late stage correction can be performed, for example, by the image processor 114 executing computer executable instructions stored in the instruction memory described above.

Figure 4C:
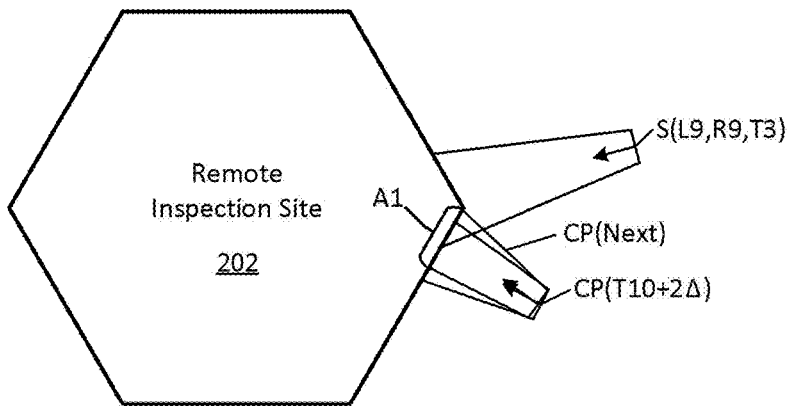

FIG. 4C illustrates the camera field at CP(T10+2Δ). The camera 108 is now almost aligned with CP(Next). The camera field at CP(T10+2Δ) covers such portions of A1 that S(L8, R8, T2) is no longer relevant can therefore be dropped from the assembly frame group. Therefore, the assembly frame group at t10 plus 2Δ can be S(L9, R9, T3) and the current frame capturing the field CP(T10+2Δ). The image assembly process assembly can be repeated, using S(L9, R9, T3), and the camera field CP(T10+2Δ). The adjusted rendering can be repeated applied, updated with the camera field at CP(T10+2Δ), producing what can be even more likely to what the camera 108 would see, if at CP(Next). The late stage correction can be repeated, for example, using information in the camera field at CP(T10+2Δ). The repeated adjusted rendering and late stage correction can be performed, for example, by the image processor 114 executing computer executable instructions stored in the instruction memory described above.

Figure 4D:
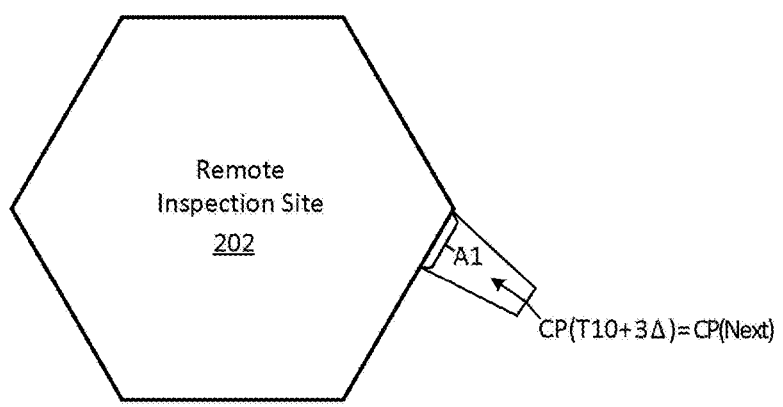

FIG. 4D illustrates the camera field at CP(T10+3Δ). The camera 108 is now aligned with CP(Next). Therefore, image assembly process can proceed using only the camera field at CP(T10+3Δ). The rending need not be an "adjusted" rendering because the camera frame is from a camera location and orientation that aligns with the user's new head position. The late stage correction can be repeated, for example, to compensate for user head movement, or to add information in the camera field at CP(T10+3Δ), or both. The rendering and late stage correction (if applied) can be performed, for example, by the image processor 114 executing computer executable instructions stored in the instruction memory described above.

Figure 5:
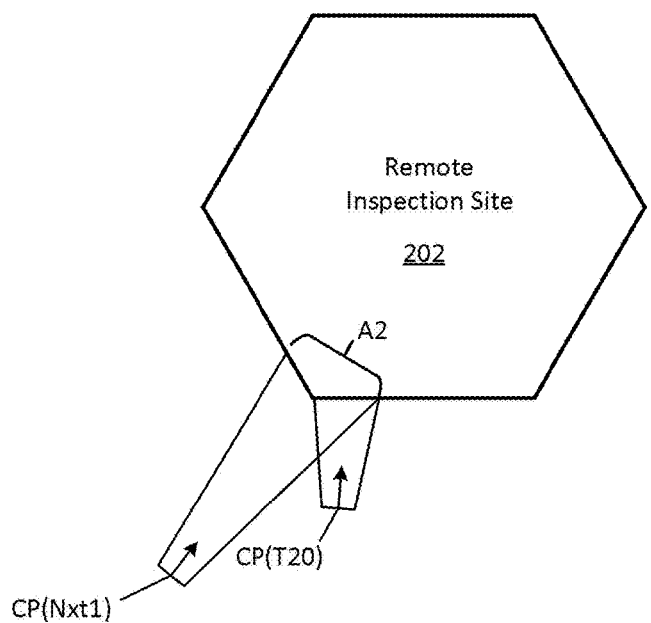
FIG. 5 illustrates another example camera position delay, for a process in 1:1 matching HMD view to head position, according to one or more aspects the present disclosure.

FIG. 5 illustrates another initial camera position delay, for another process in 1:1 matching HMD view to head position according to one or more aspects of the present disclosure. Referring to FIG. 5, the position of the camera 108 at T20 is CP(T20). It will be assumed that immediately preceding T20 the location and orientation of the user's head was sufficiently stationary that the camera 108 was in alignment with the user's head.

The example assumes that, at T20, the head tracker 110 detected the user's head had moved to another new location and orientation, labeled CP(Nxt1). However, the camera 108 lags the user's head because of system delays as described above.

FIGS. 6A-6D illustrate example assemblies of HMD views, in a process in 1:1 matching HMD view to head position, according to one or more aspects of the present disclosure. Example operations will be described assuming the change in user head position illustrated in FIG. 5, and assuming the FIG. 2 example surface map.

Figure 6A:
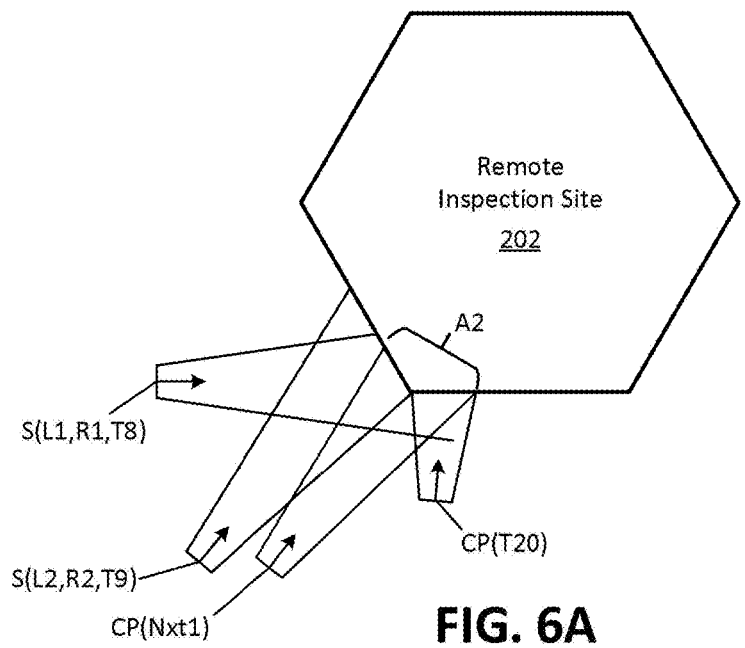
FIGS. 6A-6D illustrate example assemblies of HMD views in an another application of a process in 1:1 matching HMD view to head position, according to one or more aspects the present disclosure.

Referring to FIG. 6A, A2 is the surface view of the remote inspection site 202 that would appear on the HMD view if at T20 the camera 108 were aligned with the user's head. Due to camera lag, though, A2 is not within the T20 camera frame. Applying the above-described image assembly process operations can include searching the FIG. 2 surface map for an assembly frame group, i.e., surface map frames that, alone or in combination with one another or with the current camera frame, cover all of A2. In the FIG. 6A example, there are two assembly frame groups. One is S(L1, R1, T8) in combination with the T20 camera frame at CP(T20). The other is S(L2, R2, T9) in combination with the camera frame at CP(T20). In one implementation, the selection can be S(L2, R2, T9) in combination with the camera frame at CP(T20), because the orientation at CP(T20) is closed to the orientation of CP(Nxt1).

An adjusted rendering can then be applied to the result of assembling S(L2, R2, T9) and the camera frame at CP(T20). As described above, the adjusted rendering can be an inverse of the distortion, of the raw HMD view, using the location and orientation information of each surface map frame in the assembly frame group. The result of the adjusted rendering can be a 3D image pf what the user would likely see if, as a hypothetical, the camera 108 had tracked the change in head position, with zero delay (which is viewing position corresponding to CP(Nxt1)). In this example, the assembly frame group includes the current camera field at CP(T20), and therefore the adjusted rendering output has a higher likelihood of success.

The result of the adjusted rendering applied to the result of assembling S(L2, R2, T9) and the camera frame at CP(T20) can be presented as the HMD view. Processes can also include applying a late stage correction to the output of the adjusted rendering, for example, to compensate for a late detection of additional head movement by the user.

The above-described adjusted rendering and the late stage correction can be performed, for example, by the image processor 114 executing computer executable instructions stored in the instruction memory described above.

Figure 6B:
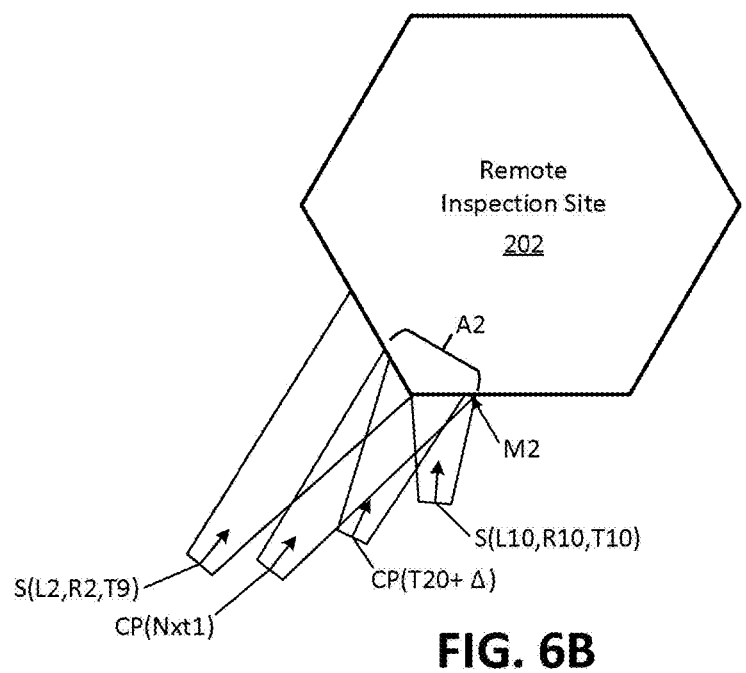

FIG. 6B illustrates the camera 108 position CP(T20+Δ), and a corresponding camera field. The previous camera field, CP(T20), can be added as a surface map frame S(L10, R10, T10). The surface coverage of the camera field at CP(T20+Δ) leaves a portion M2 uncovered. Adding surface frame S(L10, R10, T10) to the assembly frame group used at T20 covers M2 and therefore yields a new assembly frame group. The image assembly process can be repeated, using S(L2, R2, T9), S(L10, R10, T10), and the camera field at CP(T20+Δ). The adjusted rendering can be applied, updated with the camera field at CP(T20+Δ), and the late stage correction can be repeated, for example, compensating for user head movement, or using information in the camera field at CP(T20+Δ), or both.

Figure 6C:
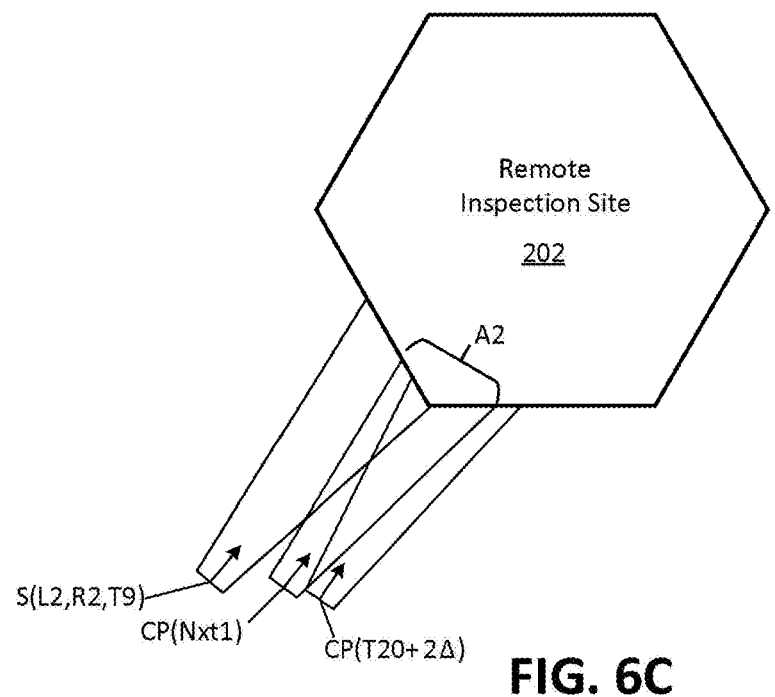

FIG. 6C illustrates the camera field at CP(T20+2Δ). The camera 108 is now almost aligned with CP(Nxt1). The same assembly frame group can be used as was used at (T20+Δ). The image assembly process can be repeated, using S(L2, R2, T9), S(L10, R10, T10), and the camera field at CP(T20+2Δ). The adjusted rendering can be applied, updated with the camera field at CP(T20+2Δ). The late stage correction can be repeated, compensating for user head movement, or using information in the camera field at CP(T20+2Δ), or both.

Figure 6D:
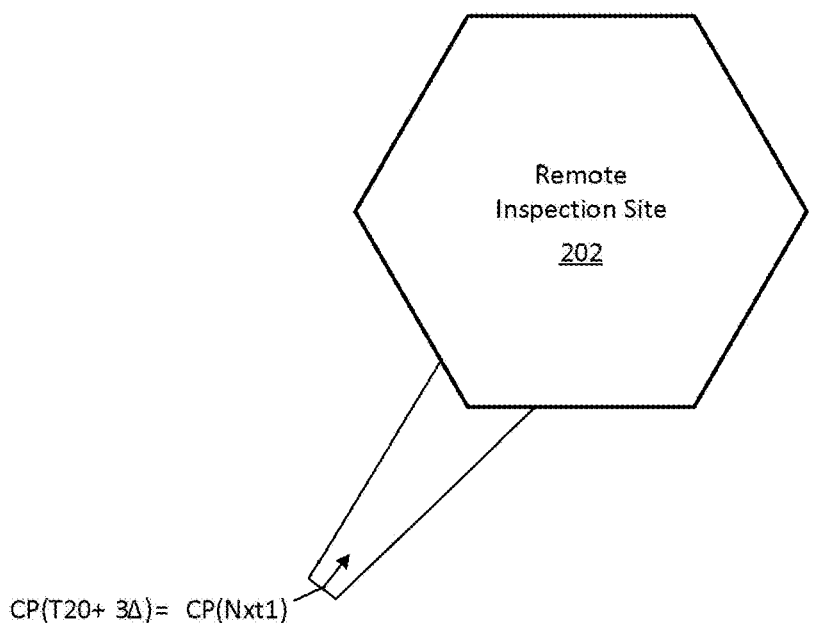

FIG. 6D illustrates the camera field at CP(T20+3Δ). The camera 108 is now aligned with CP(Nxt1). The image assembly process can therefore proceed using only the camera field CP(T20+3Δ), and the rendering need not be an "adjusted" rendering because the camera frame is from a camera location and orientation that aligns with the user's new head position. The late stage correction can be repeated, for example, to compensate for user head movement.

Figure 7:
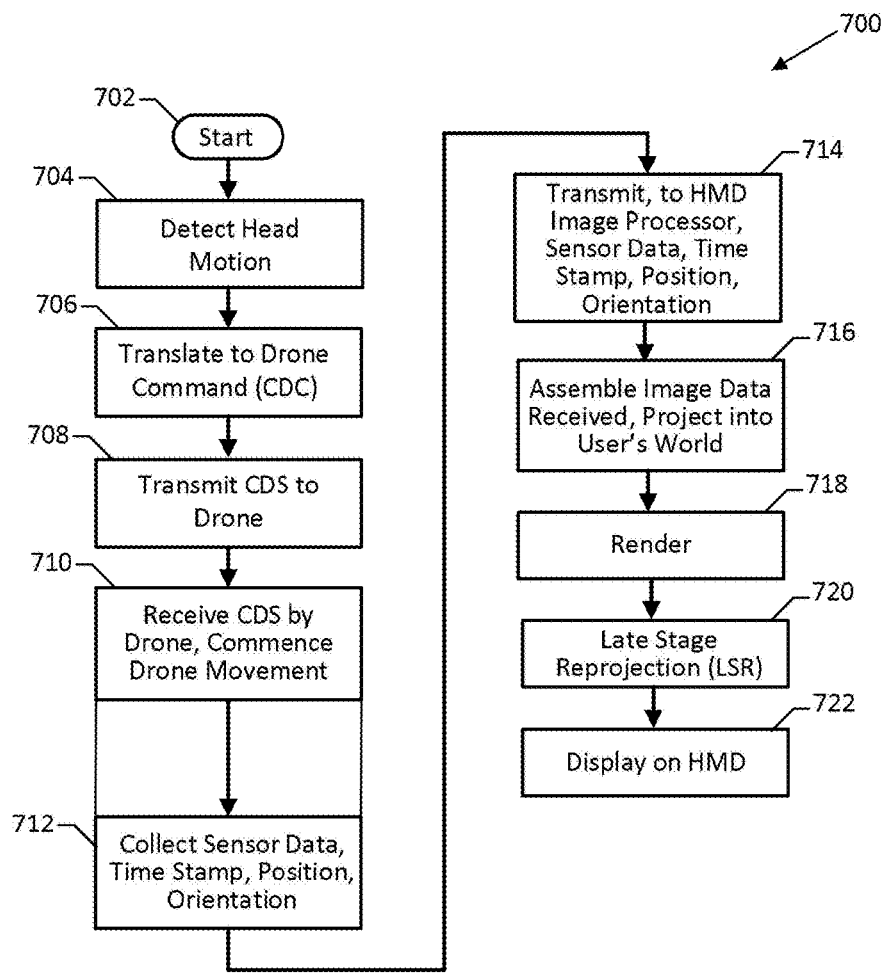
FIG. 7 illustrates a flow chart of operations in an example process in 1:1 matching of HMD view to user head movement, according to one or more aspects of the present disclosure.

FIG. 7 illustrates a flow chart 700 of example operations in processes in one or more systems and methods providing 1:1 matching of HMD view to user head movement, according to the present disclosure. As stated earlier in this disclosure, 1:1 includes matching the motion of the camera on the drone to the user's head movement, and using the result to render at least a portion of the camera image data from known past locations and orientation of the camera, to a view of the local environment as would have been seen by the user from his current location and orientation, rendered to appear to the user as if the camera moved in 1:1 non-delayed alignment with the user's head to the next camera position.

Referring to FIG. 7, operations in the flow 700 can begin with an arbitrary start at 702, and can assume that a surface map has been formed of a subject remote inspection site, such as the remote inspection site 202 of FIGS. 2, 3, 4A-4D, 5, and 6A-6D. The flow 700 can then wait until detecting a head motion at 704, for example by monitoring output of the head position tracker 110. The flow 700 can then proceed to 706 and translate the updated head position data HP into a command, e.g., CSC, that when executed by the drone 106 (e.g., by the drone propulsion and steering controls, or by a movement of the multiple-axis gimbal mount (if used) for the camera 108, or both, places the camera 108 at a location and orientation matching (at a distance) that of the user's head. The flow 700 can then proceed to 708 and transmit CSC to the drone 106. The flow 700 can then proceed to 710 where the drone 706 can begin executing the command; i.e., moving the camera 708 into the commanded position.

The flow 700 can then, preferably while operations at 710 are ongoing, proceed to 712 and 714 to collect data and download image data. Operations at 712 can include generation of image frames, e.g., frames and, for each, applying a camera position and time stamp and transmitting that over the wireless link LK, back to the image processor 114. The flow 700 can then proceed to 716 and perform operations of assembling the frame data into a form usable by, e.g., aligned with, and adding informational content useable for or by the user's HMD worldview. After the assembly operations, the flow 700 can proceed to 718 and perform the above-described adjusted rendering. After the adjusted rendering, the flow 700 can proceed to 720 and apply LSR, for example, to adjust for additional head motion by the user, or incorporate new information, or both, and then proceed to 722 to display the information in the user HMD.

Figure 8:
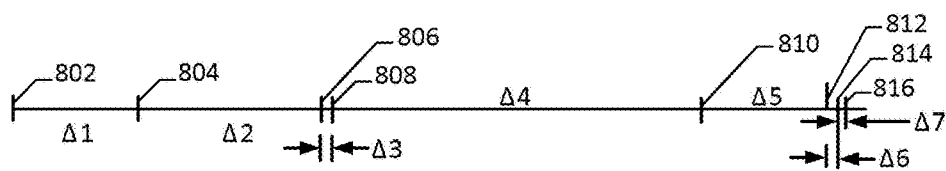
FIG. 8 illustrates exemplary time costs in systems, methods, and processes in 1:1 matching of HMD display to user head movement, according to one or more aspects of the present disclosure.

FIG. 8 illustrates exemplary time costs in systems, methods and operations thereof, in 1:1 matching of HMD display to user head movement, according to one or more aspects of the present disclosure. Referring to FIG. 8, event 802 can include the head position tracker 110 detecting a movement of the user's head and, in response, the camera position controller 112 generating and transmitting instructions (e.g., CSC) through the wireless transceiver 104 to the drone 106 such that, if executed, should cause the camera 108 to move in a 1:1 relation to the user's head to the new position. An example time cost is labeled "Δ1." Exact values of Δ1 are believed to be application specific. One illustrative example range can, but does not necessarily include 100 milliseconds. Event 804 can include the drone 108 receiving the instruction and starting to respond. An example time cost is labeled "Δ2." Exact values of Δ2 are believed to be application specific. One illustrative example range can, but does not necessarily include 150 milliseconds. Event 806 can include data collection by the drone 106 and its camera 110, for example collecting frames, collecting position data, and time stamping. An example time cost is labeled "Δ3." Exact values of Δ3 are believed to be application specific. One illustrative example range can, but does not necessarily include 10 milliseconds. Event 808 can include transmitting the data back to the image processor 118, or another processing resource. An example time cost is labeled "Δ4." Exact values of Δ4 are believed to be application specific. One illustrative example range can, but does not necessarily include 300 milliseconds. Event 810 can include the above-described process and operations assembling the data from the camera 108 into a form for viewing, with additional processing, in the user world environment. An example time cost is labeled "Δ5." Exact values of Δ5 are believed to be application specific. One illustrative example range can, but does not necessarily include 100 milliseconds. Event 812 can include the above-described adjusted rendering. An example time cost is labeled "Δ6." Exact values of Δ6 are believed to be application specific. One illustrative example range can, but does not necessarily include 10 milliseconds. Event 814 can include the above-described late stage re-projection. An example time cost is labeled "Δ7." Exact values of Δ7 are believed to be application specific. One illustrative example range can, but does not necessarily include 2 milliseconds.

Figure 9:
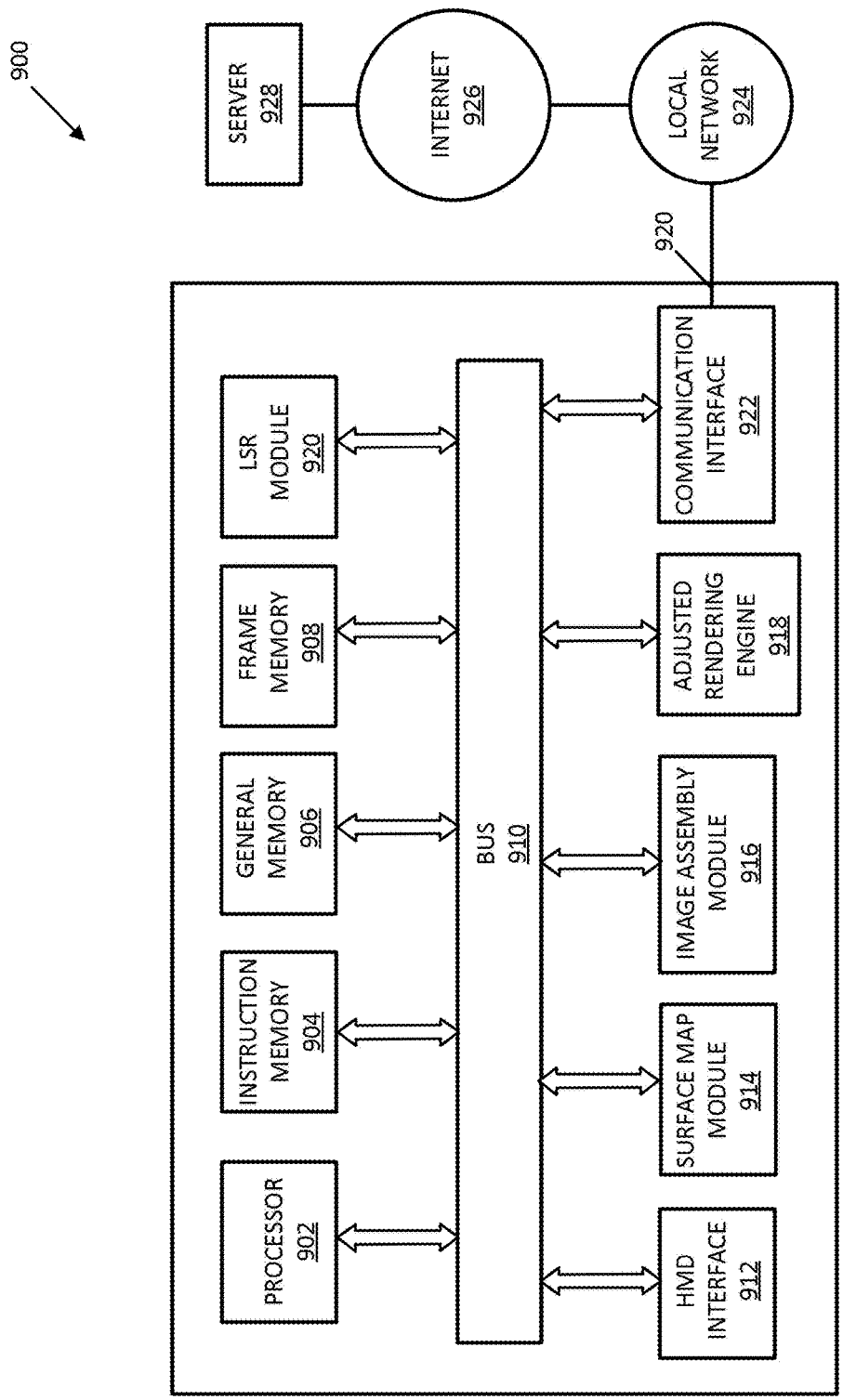
FIG. 9 illustrates a functional block diagram of an example processor, configured to perform various exemplary processes and operations defined according to systems and methods according to one or more aspects of the present disclosure.

FIG. 9 illustrates a functional block diagram, of a processor 900, configured to perform operations and processes in systems and methods according to the present disclosure. It will be understood that functional blocks illustrated in FIG. 9 are logical blocks, and do not necessarily correspond to particular hardware. For example, the image processor 900 can be provided by processing and storage resources of an HMD processor (not explicitly visible in FIG. 1), which can be integrated in the HMD 102.

Referring to FIG. 9, the image processor 900 can include a data processor 902, a general purpose memory 904, an instruction memory 906, and a frame memory 908, coupled by a bus 910. An HMD interface 912 can be included, coupled for example to the bus 910, to receive HT and HP from the HMD 902 and to provide output from the image processor 900 to the HMD 102 of visual display data. The instruction memory 906 can include a tangible medium retrievably storing computer-readable instructions that when executed by the data processor 902 cause the processor to perform operations, described in greater detail in the following paragraphs, providing each of a surface map module 914, an image assembly module 916, an adjusted rendering engine 918, a late stage re-projection (LSR) module 920. The processor 900 can include a communication interface 922, to a local network 924, the Internet 926, and to a server 928.

Features of the surface map module 914 can include storing, for example, in the frame memory 908, a population of the surface map frames S(Lx, Rx, Tx) forming a surface map, as described above. The surface map module 914 can be further configured to update the set of frames, and therefore update and extend the surface map, in response to new image information received from the camera 108 as the user moves his head location, or orientation, or both in performing virtual presence inspection of the regions of interest.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An apparatus comprising:
a head mounted display configured to be worn by a user;
a head position tracker configured to track a position of the user's head, and generate a corresponding head position signal;

a camera position controller configured to detect a change in the position of the user's head from a current head position to a new head position and, based at least in part on detecting the change, to communicate a command to a movable support for a camera to a next camera position, the next camera position being aligned with the new head position;

a data storage configured to store a surface map, the surface map including a population of past views of respective portions of an environment and, for each past view, information identifying its viewing position;

an image assembly module, coupled to the data storage, and configured to determine, based on the next camera position, a next camera viewing region, the next camera viewing region being a region of an environment that will be in a camera field of the camera when in the next camera position, receive a camera image frame from the camera, the camera image frame including an indication of camera position, determine, based at least in part on the indicated camera position, whether the image frame covers all of the next camera viewing region, and upon determining the camera image frame does not cover all of the next camera viewing region, generate an assembled image frame that encompasses the next camera viewing region, the assembled image frame including image data from at least one of the past views; and a rendering module configured to render a 3D image from the assembled image frame, the 3D image appearing as if viewed from the next camera position.

2. The apparatus of claim 1, wherein the rending module is an adjusted rendering module, configured to perform a rendering of the assembled image frame and to include in the rendering an adjustment for differences between the viewing positions of past views and the next camera position.

3. The apparatus of claim 2, wherein:
the indication of position of the camera is a camera position stamp,
the past views are surface map frames,
each surface map frame includes a viewing position stamp, and
differences between the viewing positions of past views and the next camera viewing position are based on differences between the viewing position stamps of the surface map frames and the next camera position.

4. The apparatus of claim 3, wherein rendering the assembled image frame includes:
forming an image frame group, the image frame group including, as members, surface map frames that each map at least a portion of a respective surface region that is within the next camera viewing region, wherein
the assembled image frame includes members of the image frame group.

5. The apparatus of claim 4, wherein the surface map frames further include respective time stamps, and the image assembly module is further configured to include, in forming the image frame group, the respective time stamps of the surface map frames.

6. The apparatus of claim 4, wherein the image assembly module is further configured to:
determine if the camera image frame includes at least a portion of the next camera viewing region, and
upon determining that the camera image frame includes at least a portion of the next camera viewing region, to include at least a portion of the camera image frame in the assembled image frame.

7. The apparatus of claim 1, wherein:
the surface map further includes depth sensor data associated with sensed portions of the environment, and
the image assembly module is further configured to:
determine, upon determining that the camera image frame does not cover all of the next camera viewing region, whether the sensed portions of the environment are within the next camera viewing region, and
include, upon determining that the sensed portions of the environment are within the next camera viewing region, at least a portion of the depth sensor data in the assembled image frame.

8. The apparatus of claim 1, wherein the image assembly module is further configured to update the surface map based at least in part on the received camera image frame.

9. The apparatus of claim 1, further comprising:
a late stage re-projection module configured to perform a late stage re-projection of the 3D image for display on the head mounted display.

10. The apparatus of claim 1, wherein the camera position controller is further configured to:
receive camera position information from the movable camera support, and
generate the camera control signal further based on the camera position information.

11. A method comprising:
storing a surface map, the surface map including a population of past views of respective portions of an environment and, for each past view, information identifying its viewing position;
tracking a position of a user's head;
detecting, based the tracking, a change in a position of the user's head from a current head position to a new head position;
upon detecting the change in the position of the user's head, communicating a command to a movable support for a camera to a next camera position, the next camera position being aligned with the new head position;
determining, based on the next camera position, a next camera viewing region, the next camera viewing region being a region of the environment that will be in a camera field of the camera when in the next camera position;
receiving a camera image frame from the camera, the camera image frame including a camera position stamp;
determining, based at least in part on the camera position stamp, whether the image frame covers all of the next camera viewing region;
upon determining the camera image frame does not cover all of the next camera viewing region, generating an assembled image frame that encompasses the next camera viewing region, the assembled image frame including image data from at least one of the past views; and
rendering a 3D image from the assembled image frame, the 3D image appearing as if viewed from the next camera position.

12. The method of claim 11, wherein the rending includes an adjusted rendering that included adjusting for differences between the viewing positions of past views and the next camera position.

13. The method of claim 12, wherein:
the past views are surface map frames, each surface map frame includes a viewing position stamp, and differences between the viewing positions of past views and the next camera viewing position are based on differences between the viewing position stamps of the surface map frames and the next camera position.

14. The method of claim 13, wherein generating the assembled image frame includes:

forming an image frame group, the image frame group including, as members, surface map frames that each map at least a portion of a respective surface region that is within the next camera viewing region, wherein the assembled image frame includes members of the image frame group.

15. The method of claim 14, wherein:

the surface map frames further include respective time stamps, and forming the image frame group is further based, at least in part, on the respective time stamps of the surface map frames.

16. The method of 14, wherein generating the assembled image frame further includes:

determining whether the camera image frame includes at least a portion of the next camera viewing region, and upon determining that the camera image frame includes at least a portion of the next camera viewing region, including at least a portion of the camera image frame in the assembled image frame.

17. The method of claim 16, wherein the surface map further includes depth sensor data associated with sensed portions of the environment, and wherein generating the assembled image frame further includes:

upon determining that the camera image frame does not cover all of the next camera viewing region, determining whether the sensed portions of the environment are within the next camera viewing region, and upon determining that the sensed portions of the environment are within the next camera viewing region, including at least a portion of the depth sensor data in the assembled image frame.

18. The method of claim 11, wherein rendering the 3D image includes rendering the 3D image for display on a head mounted display worn by the user, and wherein the method further includes displaying the 3D image on the head mounter display.

19. The method of claim 11, further comprising:

detecting, based on the tracking the position of the user's head, a further change in the position of the user's head and;

late stage correcting the 3D image to a corrected 3D image, based at least in part on the detected further change in the position of the user's head.

20. The method of claim 11, further comprising updating the surface map, based at least in part on the received camera image frame.

* * * * *